US008401466B2

(12) United States Patent
Bidigare et al.

(10) Patent No.: US 8,401,466 B2
(45) Date of Patent: Mar. 19, 2013

(54) SCALABLE HIGH SPEED MIMO-SATELLITE COMMUNICATION SYSTEM

(75) Inventors: Thomas Patrick Bidigare, Arlington, VA (US); Daniel Tien-Don Chang, Ann Arbor, MI (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 485 days.

(21) Appl. No.: 12/700,492

(22) Filed: Feb. 4, 2010

(65) Prior Publication Data

US 2011/0188586 A1 Aug. 4, 2011

(51) Int. Cl.
*H04B 7/185* (2006.01)
(52) U.S. Cl. .................... 455/12.1; 455/452.2; 455/427; 455/509
(58) Field of Classification Search .................. 455/3.02, 455/427, 429, 430, 12.1, 13.2, 13.3, 13.1, 455/452.1, 452.2, 509, 451; 370/350, 319, 370/316
See application file for complete search history.

(56) References Cited

U.S. PATENT DOCUMENTS

| 8,121,020 | B1 * | 2/2012 | von der Embse | 370/206 |
|---|---|---|---|---|
| 2009/0034448 | A1 * | 2/2009 | Miller et al. | 370/316 |
| 2009/0289839 | A1 | 11/2009 | McDaniel | |
| 2011/0194591 | A1 * | 8/2011 | Agee et al. | 375/219 |

FOREIGN PATENT DOCUMENTS

WO WO 2009/036814 3/2009

OTHER PUBLICATIONS

Hult et al., "Capacity of a Satellite Diversity System Employing Multiple Polarizations", *Blekinge Inst. of Tech, European Space Agency*, Oct. 2006, 4 pages.

Liolis et al., "Multi-Satellite MIMO Communications at Ku-Band and Above: Investigations on Spatial Multiplexing for Capacity Improvement and Selection Diversity for Interference Mitigation", *Eurasip Journal on Wireless Communications and Networking*, vol. 2007, Article ID 59608, May 2007, 11 pages.
Mohammed et al., "Performance Evaluation of a MIMO Satellite Diversity System", *Blekinge Inst. of Tech. 10th International Workshop on Signal Processing for Space Communications*, Oct. 2008, 5 pages.
Nordebo et al., "A Semi-definate Programming Approach to Spatial Decorrelation of Independently Polarized Signals", *Wiley InterScience*, Jan. 2006, 11 pages.
Oh, et al., "Analysis of the Rain Fading Channel and the System Applying MIMO", *International Symposium of Communications and Information Technologies*, Oct. 2006, 4 pages.
Schwarz et al., "Optimum-Capacity MIMO Satellite Broadcast System: Conceptual Design for LOS Channels, "*4th Advanced Satellite Mobile Systems—Proceedings, ASMS 2008*, Aug. 2008, 6 pages.
International Search Report and Written Opinion of the International Searching Authority of Application No. PCT/US2010/059736, mailed Jul. 26, 2011.

(Continued)

*Primary Examiner* — John J Lee
(74) *Attorney, Agent, or Firm* — Ropes & Gray LLP

(57) ABSTRACT

This invention provides satellite communication systems and methods that employ a satellite in MIMO communication with a geographically-distributed array of ground nodes. In an embodiment, the satellite communication system includes a MIMO satellite configured to receive first information at a higher bandwidth, process the first information into lower bandwidth signals, and relay the lower bandwidth signals using a satellite communication link. The geographically-separated ground nodes receive the lower bandwidth signals and transmit terrestrial signals using high-speed communication links. A central processing node receives the terrestrial signals over the high-speed communication links and combines the terrestrial signals to obtain the higher data rate signals.

29 Claims, 7 Drawing Sheets

OTHER PUBLICATIONS

Benjamin Ros et al "Increasing Reliability of an Interactive Mobile Satellite Telecommunication System Using Diversity and MIMO Schemes", Wireless Communications & Signal Processing, 2009. WCSP 2009. International conference on, IEEE, Piscataway, NJ, USA Nov. 13, 2009 SP031594593, ISBN: 978-1-4244-4856-2, pp. 1-5.

Knopp et al., "Sattelite System Design Examples for Maximum MIMO Spectral Efficiency in Los Channels", Global Telecommunications Conference 2008. IEEE Globecom 2008. IEEE, IEEE, Piscataway, NJ, USA, Nov. 30, 2008, XP031370237, ISBN: 978-1-4244-2324-8, pp. 1-6.

* cited by examiner

SCALABLE HIGH SPEED MIMO-SATELLITE COMMUNICATION SYSTEM

TECHNICAL FIELD

This invention relates to satellite communication, and is particularly applicable, without limitation, to high speed scalable satellite communications.

BACKGROUND

Higher bandwidth requirements for imaging, broadcasting, weather forecasting, and other commercial and military applications increase the need for faster, more robust satellite communications. Current state-of-the-art satellite communication systems have been unable to keep up with the increased demand due to various limitations. For example, conventional satellite systems operate in single-input-single-output (SISO) mode, where a single information-bearing signal is transmitted from ground to space or space to ground. SISO communication links have data rates that are fundamentally limited by their allocated bandwidth, their transmit power, and their antenna sizes. SISO communication capacity grows only logarithmically with the transmitted power and antenna size, thus requiring installation of more powerful and expensive satellites to achieve increases in data capacity.

While efforts have been made to enhance reliability and performance of satellite networks using terrestrial relay stations, current proposals introduce several vulnerabilities. For example, proposed satellite communication networks that employ terrestrial relay points may require protected ground nodes to assure data security and integrity, large and expensive antennas, or may be susceptible to adverse weather conditions.

To meet the escalating demand for higher data rates, a more scalable satellite communication system is therefore needed. It would also be desirable to achieve higher data capacity in satellite communications while limiting vulnerabilities to adverse weather conditions, high costs of multiple relay satellites, and degradation to data security and integrity of conventional systems.

SUMMARY

This invention provides satellite communication systems and methods that employ a satellite in MIMO communication with an array of geographically-distributed ground nodes. The satellite communication systems and methods of the present invention provide a more scalable satellite communication system that can achieve higher data capacity while limiting vulnerabilities to adverse weather conditions, high costs of multiple relay satellites, and degradation to data security and integrity of conventional systems.

Generally, MIMO (multiple-input-multiple-output) communication involves the use of more than one antenna to send and receive two or more data streams over the same channel substantially simultaneously. In the illustrative embodiments described below, MIMO techniques are employed using a satellite equipped with an array of space-borne transmit antennas in communication with a geographically-distributed array of receive antennas. With proper antenna placement to allow frequency reuse, data capacity grows approximately linearly with the number of transmit/receive antenna pairs, and data rates exceeding one terabit per second are feasible. For ease of description, a satellite that uses more than one antenna to send or to receive two or more data streams over the same channel substantially simultaneously to or from more than one antennas will be referred to herein as a "MIMO satellite."

In an embodiment, a satellite communication system or method employs a MIMO satellite in communication with an array of geographically-separated ground nodes. In an embodiment, the MIMO satellite is the sole satellite that is in MIMO communication with the ground nodes. The MIMO satellite receives first information at a higher data rate. The first information is received from a ground-based data source or a space-borne source (e.g., a sensing satellite). As used herein, a "higher data rate" refers to a data rate that is greater than what could be transmitted on any individual antenna in either the transmit array or the receive array. The first information received by the MIMO satellite includes, without limitation, voice data, computer programs, images, video data, or control signals. The MIMO satellite processes the first information into lower bandwidth signals and relays the lower bandwidth signals to an array of geographically-separated ground nodes using a satellite communication link. As used herein, "lower bandwidth" refers to a data rate that is equal to or less than the data capacity of an individual transmit or receive antenna. In an embodiment, the satellite relays the lower bandwidth signals using a space-borne array of transmit antennas. The array of transmit antennas is configured to transmit the lower bandwidth signals to the array of geographically-separated ground nodes using MIMO communication protocols. In an embodiment, each ground node is equipped with a receive antenna for receiving a unique linear combination of the lower bandwidth signals. Each ground node in the array of geographically-separated ground nodes transmits a terrestrial signal derived from the received linear combination to a central processing facility over a terrestrial communication link. The higher bandwidth data transmitted by the MIMO satellite can be recovered at the central processing facility when the terrestrial signals from multiple ground nodes are combined.

Use of a geographically-separated array of ground nodes offers several advantages. For example, adequate spacing of the ground nodes to satisfy the diffraction allows data rates to grow linearly (rather than logarithmically) with the number of antenna pairs and may obviate the need for use of repeaters to augment capacity. In addition, while a communication network that uses geographically-concentrated antennas (such as multiple antennas located on the same ground terminal) remains highly susceptible to weather conditions and other atmospheric disturbances, a distributed ground array experiences a graceful degradation in SNR as the ground nodes are relatively more isolated from each other in their susceptibility to these sources of interference. Furthermore, because each ground node in the MIMO satellite system receives a unique linear combination, and can extract only a portion of the aggregate higher bandwidth signal, intercepting the higher bandwidth signal relayed by the MIMO satellite would require obtaining received data from more than one ground node. Therefore, individual ground nodes in the array of ground nodes may not generally require a high level of protection or security.

Generally, the satellite communication link (between the MIMO satellite and the geographically-separated ground nodes) has a greater aggregate data capacity than the individual terrestrial communication links between the ground nodes and the central processing node. In an embodiment, the satellite communication link is a radio-frequency link, and the terrestrial communication links are fiber optic links, coaxial cables, microwave links, or other suitable high-speed communication links. However, because the terrestrial communication links correspond to high speed data links, each ground node can process the received combination of lower bandwidth signal into a terrestrial data signal having a higher data rate than that of the received signal, in order to make efficient use of the high-speed link. For example, a terrestrial signal can include, without limitation, a compressed version of received lower bandwidth signal, an analog version of a digital signal, a higher resolution version of the received lower bandwidth signal, a digitally-sampled version of a received analog signal, an encrypted version of the lower bandwidth signal, or an alternate coding of the lower bandwidth signals. To the extent additional information is needed by the central processing node to process the terrestrial signals, the additional information can be forwarded to the central processing node.

The satellite communication network of this invention can be employed in a number of applications. In one application, the MIMO satellite communication system is employed as a high data rate trunk relay link between a ground-based locations. In an embodiment, the ground-based locations communicate through two arrays of ground nodes that are in MIMO communication with the MIMO satellite. In this embodiment, the satellite receives the first information from a first one of the arrays of ground nodes using MIMO techniques and relays the information to a second one of the arrays of ground nodes, also using MIMO techniques. In another application, the satellite communication system is employed as a high data rate trunk relay for down-linking data from other satellites, such as for example, a sensing satellite or a space-observation satellite, to an array of ground nodes. In another embodiment, the satellite communication system is employed as a high data rate trunk relay for up-linking data from ground nodes to other satellites. In an embodiment, the MIMO satellite and the other satellites communicate over a high data rate laser crosslink, while the MIMO satellite and the ground nodes communicate using MIMO techniques. In another embodiment, the other satellites can be equipped with multiple antennas, enabling the other satellite to also engage in MIMO communication with the MIMO satellite.

BRIEF DESCRIPTION OF THE FIGURES

The foregoing and other objects and advantages of the invention will be appreciated more fully from the following further description thereof, with reference to the accompanying drawings. These depicted embodiments are to be understood as illustrative of the invention and not as limiting in any way.

DETAILED DESCRIPTION OF ILLUSTRATIVE EMBODIMENTS

To provide an overall understanding of the invention, certain illustrative embodiments will now be described, including systems and methods for sending and receiving data in MIMO satellite communication system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
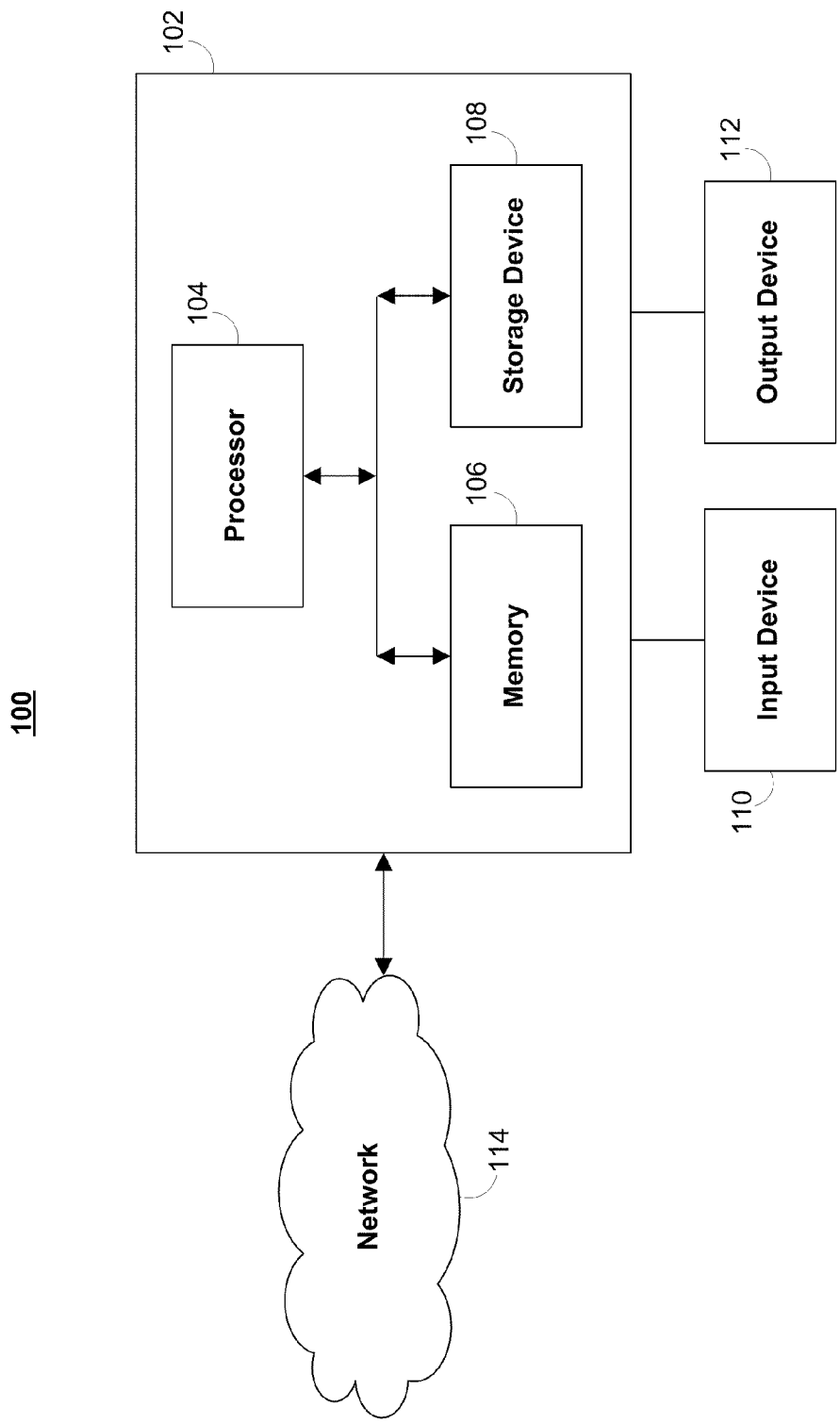
FIG. 1 shows a high-level block diagram of a computing system 100 in accordance with an illustrative embodiment of the invention.

FIG. 1 shows a high level block diagram of a computing system 100 that may be employed in accordance with an illustrative embodiment of the invention. For example, computing system 100 can be employed as a processing unit in a satellite, a ground node, or a central processing node of the present invention. System 100 includes a computing device 102 that has processor 104, computer-readable medium 106, such as random access memory, and storage device 108. Computing device 102 also includes a number of additional external or internal devices. An external input device 110 and an external output device 112 are shown in FIG. 1. The input devices 110 include, without limitation, a mouse, a CD-ROM, or a keyboard. The output devices include, without limitation, a display or an audio output device, such as a speaker.

In general, computing device 102 may be any type of computing platform (e.g., one or more general or special purpose computers), and may be connected to network 114. Computing device 102 is exemplary only. Concepts consistent with the present invention can be implemented on any computing device, whether or not connected to a network.

Processor 104 executes program instructions stored in memory 106. Processor 104 can be any of a number of well-known computer processors, such as processors from Intel Corporation, of Santa Clara, Calif. Processor 104 can be used to run operating system applications, applications for receiving, transmitting, or processing data in accordance with the satellite communication based on this invention, and/or any other application. Processor 104 can drive output device 112 and can receive user inputs from input device 110.

Memory 106 includes one or more different types of memory that may be used for performing system functions. For example, memory 106 includes cache, Flash, ROM, RAM, or one or more different types of memory used for temporarily storing data.

Storage device 108 can be, for example, one or more storage mediums. Storage device 108, may store, for example, data for transmitting by a satellite node, data received at a ground node, additional data transmitted by a ground node, data received at a central processing node, processor-executable instructions for relaying data in accordance with one or more methods described herein, or any suitable applications for processing transmitted or received data. Storage device 108 can be a removable or a fixed storage device, and can store processor-executable instructions for performing a method for sending and/or receiving data in the satellite communication system of the present invention.

While computing system 100 has been described in software terms, hardware implementations of system 100 are also possible. For example, the techniques, blocks, steps, and means described above and below can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. Software implementations include, without limitation, implementations in scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as storage device 108. Furthermore, any machine-readable medium tangibly embodying processor-executable instructions may be used in implementing the methodologies described herein.

Figure 2:
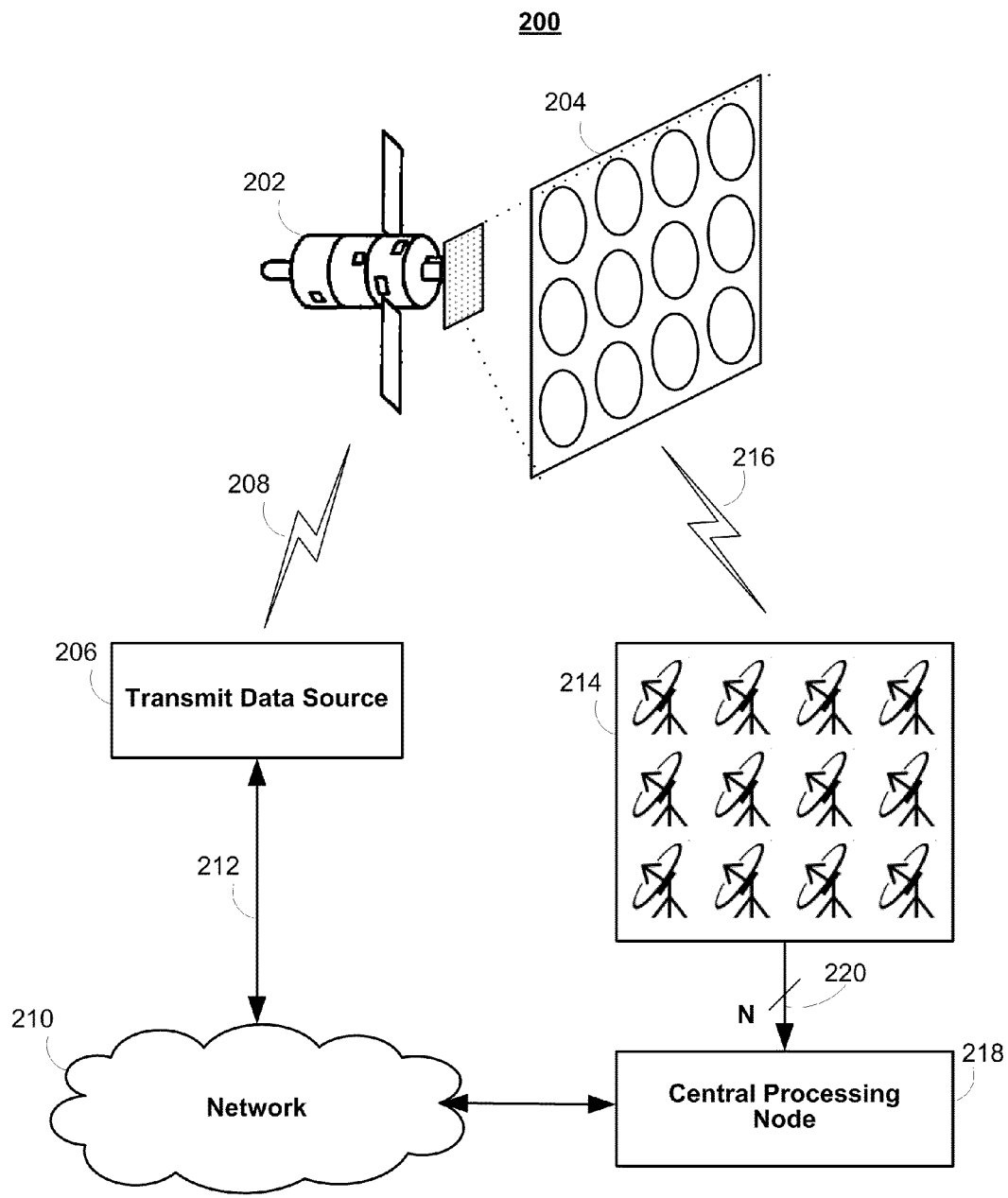
FIG. 2 shows a high-level diagram of a satellite communication system 200 in accordance with an illustrative embodiment of the invention.

FIG. 2 shows a high-level diagram of a satellite communication system 200 in accordance with an illustrative embodiment of the invention. In this embodiment, a MIMO satellite 202 relays data from a first location (e.g., a transmit data source 206) to an array of ground nodes 214 using MIMO techniques. The MIMO satellite 202 can be any suitable satellite, including, but not limited to, a military satellite, a commercial satellite, an earth observation satellite, a navigation satellite, a weather satellite, or a research satellite. In an embodiment, the satellite 202 is a fully independent or a semi-independent computer-controlled system, and can employ, for example, a computing system 100 (FIG. 1) in performing various communication tasks. In a typical usage scenario, the MIMO satellite 202 would be in a geostationary orbit so that ground-based antennas in the array of ground nodes 214, which are directed toward the satellite 202, can operate effectively without expensive equipment to track the satellite's motion. However, the satellite 202 can also be placed in a Molniya orbit, an elliptical orbit, a low (polar and non-polar) earth orbit, or any other type of orbit where necessary.

The satellite 202 receives information at a higher data rate from a transmit data source 206 over a communication link 208. In an embodiment, the communication link 208 is a laser crosslink, a radio-frequency link, or other suitable feeder link for providing data to the satellite 202. The transmit data source 206 is any suitable data source, such as for example, an array of ground nodes, a single ground-based source, or another satellite (as shown in FIG. 3B). The transmit data source 206 can, but need not, be the originator of the transmit data provided to the satellite 202. In an embodiment, the satellite 202 is the originating source of the higher data rate information that it transmits (e.g., where the satellite 202 is a data acquisition satellite, such as a weather satellite or other sensing satellite). In an embodiment, the transmit data source 206 is coupled to a network 210, such as the Internet.

The satellite 202 processes the higher data rate information into lower bandwidth signals for transmission by transmit antennas 204 using MIMO protocols. In an embodiment, each lower bandwidth signal corresponds to a unique portion of the higher data rate information. In other embodiments, the lower bandwidth signals overlap in data content, so as to provide redundancy in the transmission. The satellite 202 is equipped with an array of transmit antennas 204. Data capacity of the satellite communication system 200 generally grows approximately linearly with the number of transmit/receive antenna pairs. Therefore, the number of transmit antennas in the array of transmit antennas 204 is selected based on the transmit power of the individual antennas and the desired aggregate data capacity for the MIMO channel. For example, using principles of the present invention, a fully polarimetric, 64-transmit-antenna array at 2.5 W per antenna has a Shannon channel capacity of about two terabits per second, when configured with one square-meter aperture transmit and receive antennas at geo stationary orbit standoff. In addition, the data capacity of the system 200 can be expanded by adding more transmit/receive antenna pairs as needed. In an embodiment, the array of transmit antennas 204 are space-borne, and antennas within the array of transmit antennas 204 are spaced to allow optimal data capacities. For example, the spacing between individual transmit antennas in transmit array 204 can be jointly determined along with the spacing between the ground nodes, the wavelength, and the orbit standoff distance.

The transmit antennas in the array of transmit antennas 204 work cooperatively to simultaneously transmit the higher data rate information data received by the satellite 202 to the array of ground nodes 214. The array of transmit antennas 204 communicate with the array of ground nodes 214 using a satellite link 216. The satellite link 216 can be a radio-frequency link or other suitable satellite link now known in the art or later developed. In an embodiment, each transmit antenna in the array of transmit antennas 204 transmits a different linear combination of the lower bandwidth signals using, for example, space-time coding. In another embodiment, transmit antennas in the transmit array 204 transmit overlapping linear combinations of signals in order to add redundancy to the transmission.

The array of ground nodes 214 receives the lower bandwidth signals transmitted by the array of transmit antennas 204 over the satellite link 216. In an embodiment, a ground node in nodes 214 is a cell tower for a cellular communication network, a dedicated receiving node for satellite signals from satellite 202, or any terrestrial node that is capable of supporting the data capacity requirements of the satellite communication system. Each node in the array of ground nodes 214 is equipped with a computing system 100 (FIG. 1) having the necessary computing resources for performing various data communication tasks, such as forwarding received signals to the central processing facility. In a typical usage scenario, each node in the array of ground nodes 214 is a stationary receiving node. Mobile receiving nodes can also be used provided the system 200 includes proper tracking equipment to ensure that the mobile nodes can receive data transmitted from the satellite 202. Each node in the array of ground nodes 214 is equipped with at least one receive antenna for receiving data from the satellite 202. In an embodiment, each node in the array of ground nodes 214 is equipped with a single receive antenna for receiving data from the satellite 202, which will generally have independent orthogonally polarized feeds. For example, each node in ground nodes 214 can be equipped with a small receive antenna (about one square meter area). Such relatively small antennas are generally available as part of satellite TV receivers. In other embodiments, a receive node is equipped with multiple receive antennas if needed (e.g., for diversity coding purposes, or to receive data from other satellites to which the additional antennas are directed). In yet other embodiments, a first subset of the array of ground nodes 214 are each equipped with a single receive antenna, while each node in a second subset of the array of ground nodes 214 is equipped with multiple receive antennas.

In an embodiment, each node in the array of ground nodes 214 is configured to receive a linear combination of the individual element signals transmitted by the MIMO satellite 202. For example, each receive antenna can be associated with the particular coefficients of a linear combination that is unique to the receive antenna, and can extract a received signal based on the associated coefficients. However, the complete signal transmitted by MIMO satellite 202 can be extracted only by combining received signals from multiple ground nodes in the array of ground nodes 214. Thus, an individual ground node in the array of ground nodes 214 may not generally require a high level of individual protection as the complete data from the satellite 202 cannot be obtained from a single compromised ground node. Like the array of transmit antennas 204, the number of receive antennas in the array of ground nodes 214 can be selected based on a desired data capacity of the satellite communication system 200. For example, using principles of the present invention, a 64-transmit-antenna array at 2.5 W per 1 meter square aperture antenna has a Shannon capacity channel capacity of about two terabits per second to a geosynchronous satellite, when configured with a receive antenna array of about 70 antennas, each having an area of one square meter. As shown by this example, the number of transmit antennas in the array of transmit antennas 204 can differ from the number of receive antennas in the array of ground nodes 214. However, the linear growth in data rate does not exceed the number of transmit-receive antenna pairs. Since deploying ground nodes is easier than adding extra satellite transmit elements, the number of ground nodes generally meets or exceeds the number of transmit elements.

The nodes in the array of ground nodes 214 are geographically-separated. For example, the 70-antenna receive array of the example above may be distributed over a 200 kilometer× 200 kilometer area. Use of a geographically-separated array of ground nodes offers several advantages. For example, while a communication system that uses geographically-concentrated antennas remains highly susceptible to weather conditions and other localized atmospheric disturbances, a distributed ground array experiences a graceful degradation in SNR as the ground nodes are relatively more isolated from each other in their susceptibility to these sources of interference. In addition, when the receive antennas of the ground nodes are adequately spaced to satisfy the diffraction limit, data capacity of the satellite network grows linearly (rather than logarithmically) with the number of antenna pairs and may obviate the need for use of repeaters to augment capacity. In an embodiment, the spacing between receive antennas in the array of ground nodes 214 is determined, based on constraints imposed by the diffraction limit, to allow linearly independent scalar communication channels. With appropriate spacing between the receive antennas, each receive antenna in the array of ground nodes 214 observes a different superposition of the multiple signals transmitted by the array of transmit antennas 204. Under appropriate conditions, a linear transformation can be applied to the vector of received signals to recover the original transmitted signals. Specifically, under appropriate condition, for each respective receive antenna, the linear combination recovers only the signal for the desired transmitter element and nulls the signals from all other elements. A more detailed discussion and an algebraic formula for determining constraints on the spacing between the receive antennas is described below in relation to FIG. 5.

In an embodiment, each node in the array of ground nodes 214 sends a terrestrial signal derived from the received linear combination of the signals to a central processing node 218 using at least one of terrestrial communication links 220. In an embodiment, the satellite communication link 216 (between the MIMO satellite 202 and the array of ground nodes 214) and the terrestrial communication links 220 have different data capacities. In an embodiment, the satellite communication link 216 is a radio-frequency link. A terrestrial communication link 220 can be a fiber optic link, a coaxial cable, a microwave links, or other suitable high-speed communication link. In an embodiment, a ground node in the array of ground nodes 214 processes the received signal into a terrestrial signal having higher data rate than that of the received signal in order to make efficient use of the high-speed link. For example, a terrestrial signal can include, without limitation, an analog version of the received lower bandwidth signal, a digitally-sampled version of a received analog signal, an encrypted version of the received signal, a compressed version of the received signal, an alternate coding of the received signals, or other suitable signal derived from the received signal, and possibly ancillary data. To the extent additional information is needed by the central processing node 218 to process the terrestrial signals, the additional information can be forwarded to the central processing node 218 by the array of ground nodes 214.

The central processing node 218 includes one or more processing units for combining the terrestrial signals received from the array of ground nodes 214. In an embodiment, the central processing node 218 employs a computing system, such as the computing system 100 (FIG. 1) to perform various signal processing functions. In an embodiment, the central processing node 218 is a single processing unit. In another embodiment, the central processing node 218 includes multiple processing units working cooperatively to combine received terrestrial signals. In an embodiment, the central processing node 218 employs multi-channel signal processing or parallel processing of the terrestrial signals to obtain a combined received data. In such embodiments, each processor in the multiple processors of the node 218 can be configured to receive and to process terrestrial signals from a subset of the nodes in the array of ground nodes 214. The processed signals from each of the multiple processors are then combined to obtain the higher data rate information transmitted by the MIMO satellite 202. In an embodiment, the central processing node 218 is the intended final destination of the data sent by the MIMO satellite 202. In another embodiment, the central processing node 218 is another relay point for the final destination (not shown). In an embodiment, the central processing node 218 is a receiver node selected from the array of ground nodes 214. The central processing node 218 can be in a two-way communication with the network 210 over the communication link 222. The communication link 222 can be any suitable link (e.g., a wireless link or a wired link) for sending information or receiving information between node 218 and network 210. The central processing node 218 can be a dedicated node for processing received signals from a particular satellite, or can be shared by multiple MIMO satellites.

Therefore, by employing a MIMO satellite in a MIMO configuration with geographically-separated ground nodes, data capacity of the satellite communication network can be improved. With proper spacing of transmit and receive antennas, multiple independent communication channels can be created within the same frequency allocation, thereby allowing data rates to grow linearly with the number of transmit-receive antenna pairs.

Figure 3A:
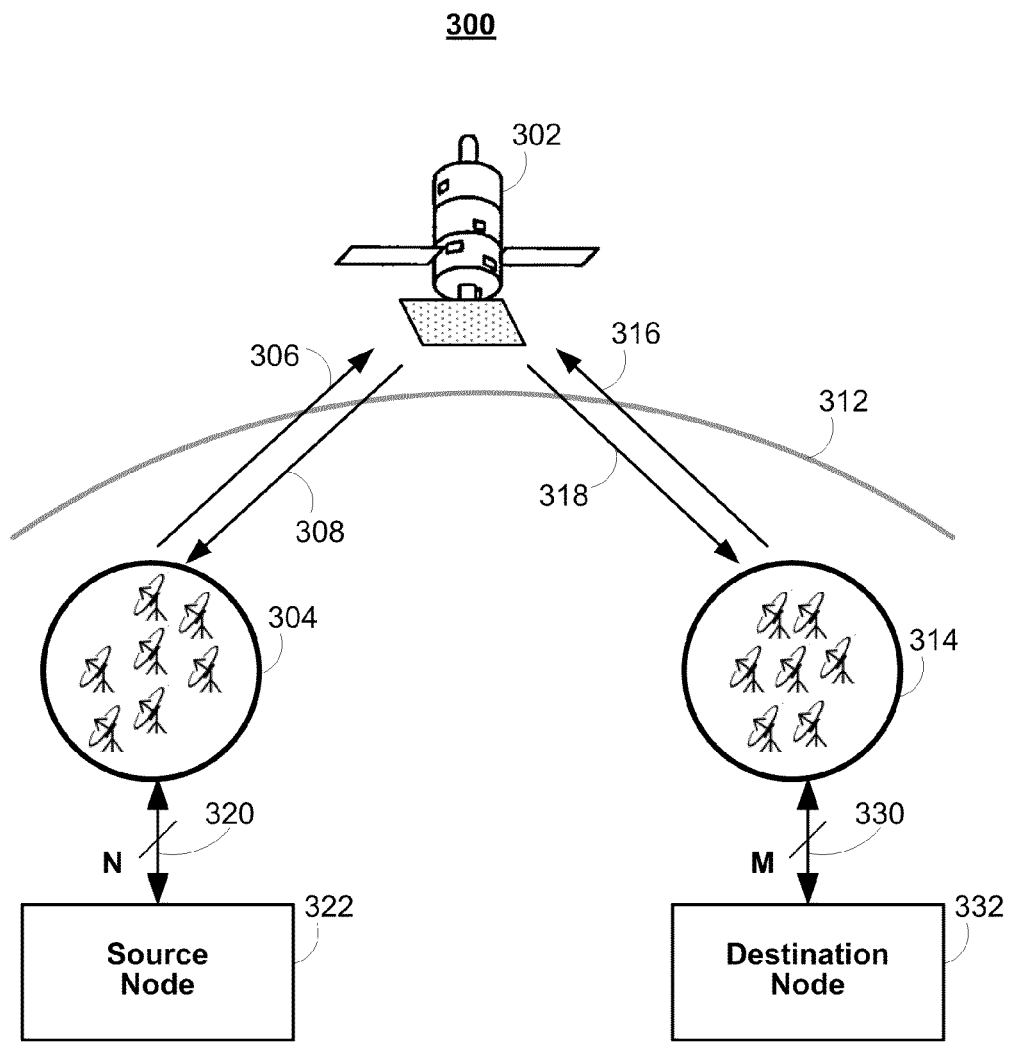
FIGS. 3A and 3B show high-level block diagrams of MIMO-satellite communication systems in accordance with illustrative embodiments of the invention.
Figure 3B:
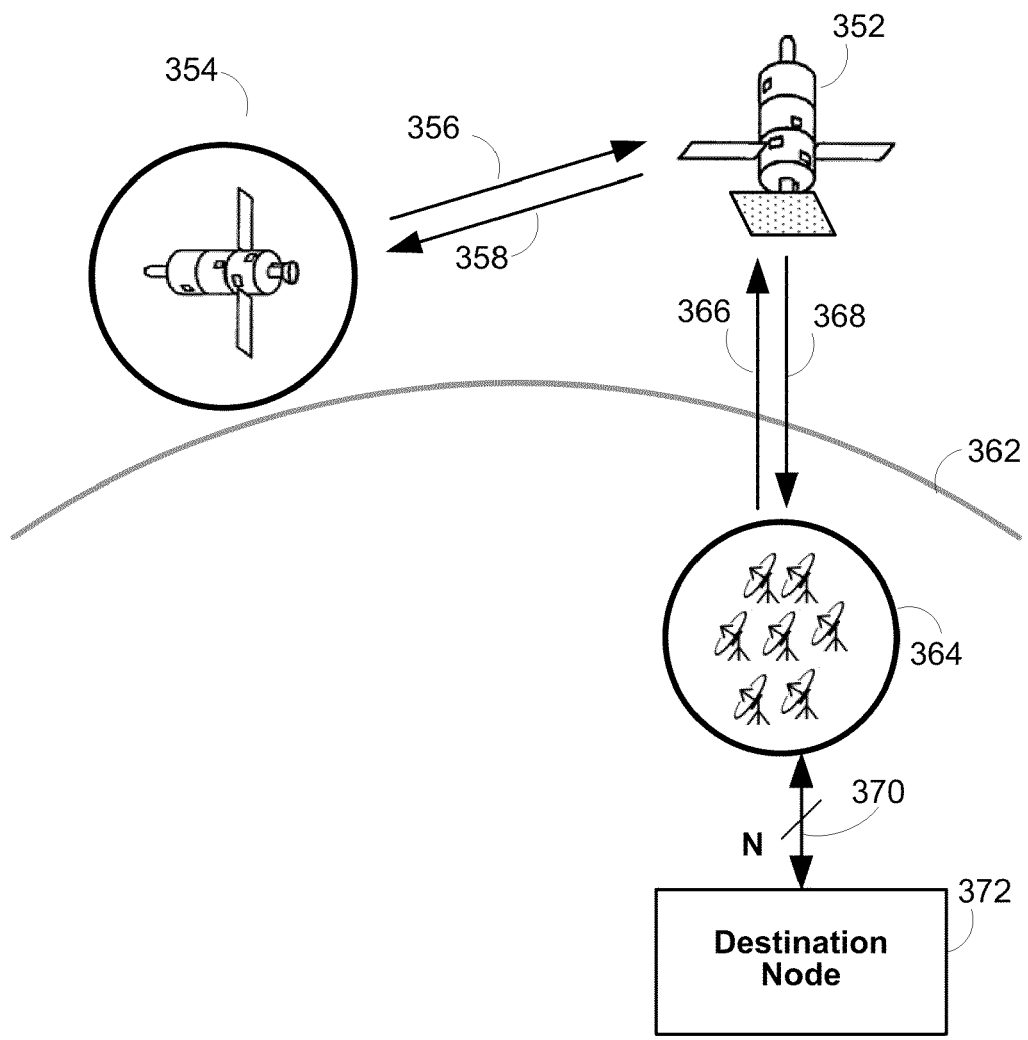

FIGS. 3A and 3B show high-level diagrams of illustrative applications of the satellite communication system 200 of FIG. 2 in accordance with some embodiments of the invention. FIG. 3A shows communication system 300 in which the MIMO satellite network operates as a trunk relay between two ground-based data sources. Through use of multiple transmit-receive antenna pairs and MIMO communication protocols, the MIMO trunk relay link can provide data rates that are orders of magnitude above that of conventional repeater relay satellites. System 300 includes MIMO satellite 302 located in an orbit above earth 312, ground nodes 304 and 314, source node 322 (which is coupled to ground nodes 304 via communication links 320), and destination node 332 (which is coupled to ground nodes 314 via communication links 330). Satellite 302 is similar to satellite 202 (FIG. 2). In this embodiment, both the uplink to and the downlink from satellite 302 use MIMO principles in accordance with the invention.

In an embodiment, the arrays of ground nodes 304 and 314 are configured similar to array of ground nodes 214 (FIG. 2). For example, nodes in the arrays of ground nodes 304 and 314 are spaced to allow maximum data capacity through creation of multiple transmit-receive channels. The number of nodes in array 304 may, but need not, correspond to the number of nodes in array 314. However, to the extent that the data rate of the MIMO relay link is limited by the number of transmit-receive antenna pairs, each array can be sized relative to the number of transmit or receive antennas in the MIMO satellite 302 to achieve a desired data capacity for the MIMO relay link. Both the source node 322 and the destination node 332 are ground-based. In addition, the source node 322 and the destination node 332 can be configured similar to the central processing node 218 (FIG. 2) in order to process data to or from the ground-node arrays. In other embodiments, a separate central processing node (not shown), in communication with each of the ground-node arrays and the source and destination nodes, is used to process data to or from the ground node arrays. The source node 322 and the destination node 332 are shown as single nodes to avoid overcomplicating the diagram. However, one or both of the source and destination nodes can include multiple data sources.

In an embodiment, the source node 322 produces from high-bandwidth data a plurality of lower bandwidth data signals using, for example, known demultiplexing and encoding techniques. The source node 322 sends the lower bandwidth signals to ground nodes array 304 via communication links 320. Communication uplinks 320 are similar to terrestrial links 220 (FIG. 2). Transmitters in the array of ground nodes 304 uplink the received data, or a modified version of the received data, to the satellite 302 using the communication links 306 (or 316 if array 314 is the sender). The uplinks 306 preferably use MIMO techniques, such that each receiving antenna on MIMO satellite 302 receives a linear combination of the lower bandwidth signals transmitted by the ground nodes in array 304. The MIMO satellite 302 transmits the received lower bandwidth signals, or a modified version of the lower bandwidth signals, to receivers in ground array 314 using downlink 318 (or 308 if array 304 is the receiver) using MIMO communication techniques in accordance with the invention. Each receiving antenna in ground nodes 314 receives a linear combination of the lower bandwidth signals transmitted by MIMO satellite 302, and relays a terrestrial signal derived from the respective linear combination to the destination node 332 via communication links 330. Communication links 330 are similar to terrestrial links 220 (FIG. 2).

FIG. 3B shows an illustrative satellite communication system 350 in which the MIMO satellite network operates as a downlink relay for one or more space-borne data sources. The communication system 350 includes a MIMO satellite 352, a sensing satellite 354 which is the data source, an array of ground nodes 364, and a destination node 372 coupled to the array of ground nodes via communication links 370. The MIMO satellite 352 is similar to the satellite 202 (FIG. 2). In this illustrative embodiment, the MIMO satellite 352 operates as a downlink for relaying data from the sensing satellite 354 to destination node 372. However, the MIMO satellite 352 can also operate as an uplink relay for sending data from the destination node 372 to the sensing satellite 354. In an embodiment, the sensing satellite 354 is any earth-sensing satellite (e.g., an electro-optical imaging satellite, a weather satellite, a radar satellite, a SIGINT, etc.) or a space observation satellite. The satellite communication system 350 includes more than one of the sensing satellite 354. The satellites 352 and 354 are located above the earth 362, and can be geographically separated by orbit or orbital slots. For example, earth-sensing satellites tend to be in low-earth orbits to provide better resolution and to increase sensitivity. Therefore, in some embodiments, the MIMO satellite 352 is located a geostationary orbit, while the sensing satellite 354 is located in a low-earth orbit (LEO).

In an embodiment, the sensing satellite 354 initiates an uplink to the MIMO satellite 352 using the communication link 356. The communication link 356 can be any suitable link between satellites, such as, for example, a high data rate laser crosslink. Where sensing satellite 354 is equipped with multiple transmit antennas, the sensing satellite 354 communicates with the MIMO satellite 352 using MIMO principles. The MIMO satellite 352 produces from the received data lower bandwidth signals and relays the lower bandwidth signals from the sensing satellite 354 to the array of ground nodes 364 using a downlink 368. The downlink 368 is similar to link 216 and the array of ground nodes 364 is similar to the array of ground nodes 214 (all of FIG. 2). Each ground node in the array of ground nodes 364 receives a linear combination of the lower bandwidth signals and provides the received signal, or a modified version of the received signal, to destination node 372 over terrestrial communication links 370. Similar to system 300, the destination node 372 can be configured similar to the central processing node 218 (FIG. 2) in order to process data to or from the ground-node array. In other embodiments, a separate central processing node (not shown), in communication with the array of ground nodes, is used to process data to or from the ground node array before the passing the data to destination node 372.

While the foregoing has focused on downstream communication, the principles also apply to the upstream relaying of data from the array of ground nodes 364 to the sensing satellite 354. In an embodiment, the array of ground nodes 364 initiates an uplink to the MIMO satellite 352 using the feeder link 366, and the MIMO satellite 352 relays the received data to the sensing satellite 354 over the communication link 358. The communication link 358 is similar to the communication link 308 (FIG. 3A) and the communication link 366 is similar to the communication link 316 (FIG. 3A). In addition, the satellite 352 need not be a sensing satellite or an observation satellite. For example, in an embodiment, the satellite 352 is another communication satellite.

Therefore, embodiments of this invention can be employed in various applications, including, without limitation, use of a MIMO satellite as a high data rate trunk relay between two terrestrial points, and for downlinking or uplinking data between other satellites and ground nodes. In both illustrative uses, a network that employs a MIMO satellite in MIMO configuration with an array of ground nodes can achieve data rates not achievable with conventional repeater-based relay systems.

Transmitters (e.g., transmit antennas in the transmit arrays of FIGS. 2-3B) can use various MIMO communication protocols to process and transmit data in an illustrative embodiment of the invention. For example, in an embodiment, the transmitters 204 (FIG. 2) employ space-time coding to transmit data from the MIMO satellite 202 (FIG. 2) to the array of ground nodes 214 (FIG. 2). In space-time coding, a high rate signal is used to create multiple lower bandwidth modulated signals and each signal is transmitted from a different transmit element in the same frequency band. If the transmitted signals arrive at the receiver antenna array with sufficiently different channel coefficients, the receiver can recover the original high rate data stream. Space-time coding generally affords high spectral efficiency by sending partially or fully unique data down a number of channels in parallel. There is an interplay between increases in gain from use of diversity and increases in throughput using space-time coding. For example, diversity can be emphasized to achieve increases in gain at the expense of throughput where signal fading is a concern. When using space-time coding, the number of resolvable signals is limited by the lesser of the number of antennas at the transmitter or the receiver. Therefore, in an illustrative communication system that includes a MIMO satellite equipped with 64 transmit antennas in MIMO communication with 70 receive antennas, 64 independent spatial streams would be created, thereby allowing the communication system to achieve a throughput that is approximately 64 times the throughput of each transmit-receive antenna pair. A more detailed discussion of these concepts follows in the descriptions accompanying FIGS. 4 and 5 below.

Figure 4:
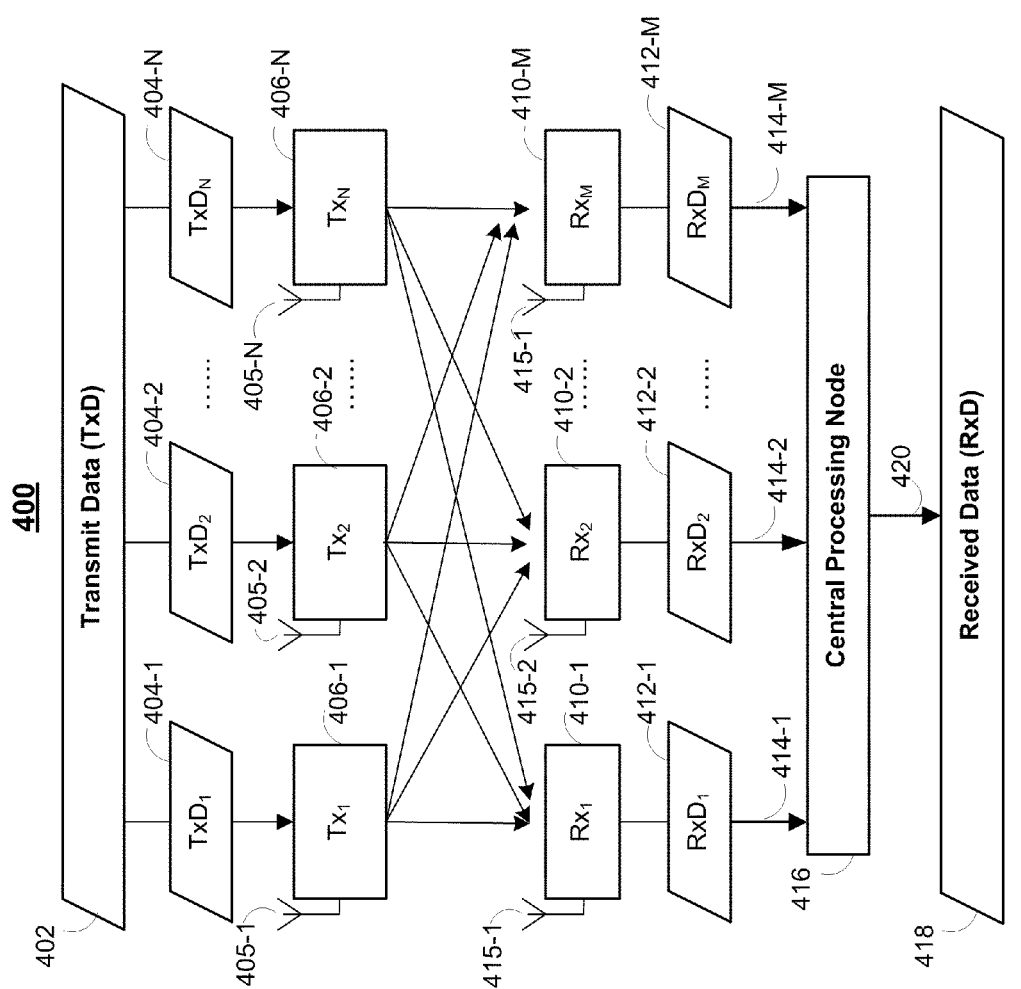
FIG. 4 shows an illustrative schematic diagram of a MIMO-satellite communication system in accordance with an illustrative embodiment of the invention.

FIG. 4 shows an illustrative schematic diagram of a MIMO-satellite communication system 400 that uses space-time coding in accordance with illustrative embodiments of the invention. System 400 includes N transmitters 404 with N transmit antennas 405, and M receivers 410 with M receive antennas 415. The transmitters 404 are any transmitters on a MIMO satellite (e.g., transmitters 204 of the MIMO satellite 202 (FIG. 2)). Typically, the space-time coding is applied to the high data rate stream 402 to produce the N lower bandwidth signals 404 transmitted by the individual transmit elements 406. However, in some embodiments, a MIMO satellite (such as MIMO satellite 202) splits a single high data rate stream 402 into N lower bandwidth signals 404 that can be respectively encoded before transmission. For example, in an embodiment, the MIMO satellite 202 QAM-encodes the N substreams using space-time block coding, trellis coding, or differential space-time coding. Space-time coding can use redundancy of information on the N substreams to increase the link margin. The space-time coding techniques used may include spatial multiplexing, space-time block coding, space-time trellis coding, or informed transmit (precoding) techniques.

Each transmit antenna 405 transmits a modulated signal 404 and each of the M receiver antennas 415 of ground nodes 410 receives a linear combination of the signals 404 transmitted by the antennas 405. Specifically, each receive antenna 415 detects a transmit signal from each of the N transmit elements, but extracts a combination of the transmitted signals based on the particular coefficients associated with the receive antenna. Ultimately, each receive antenna extracts some, but not all, of the transmitted data 402. The transmitted data 402 can be obtained only by combining the extracted signals from multiple receive antennas 415. The number of the transmitter antennas 405, N, may be less than, equal to, or greater than the number of the receive antennas 415 in various embodiments. In an embodiment, each ground node 410 processes the received signal and transmits a terrestrial signal 412 that is derived from the received signal. In a typical embodiment, the ground nodes 410 perform limited processing on the received signal prior to transmitting the terrestrial signal as most of the processing occurs at the central processing node 416. The central processing node 416 receives the terrestrial signals 412 via high-speed communication links 414. To the extent additional information is needed by the central processing node 416 to process the terrestrial signals, the additional information can be forwarded to the central processing node 416 by the ground nodes 410. The central processing node 416 processes and combines the terrestrial signals to obtain the higher information rate data stream 418. Under appropriate conditions, the combined data 418 will approximate the original transmitted data 402. In some embodiments, the combined signal 418 is an alternate form of the transmitted signal 402. In an embodiment, central processing node 416 provides the combined data over a communication link 420.

Figure 5:
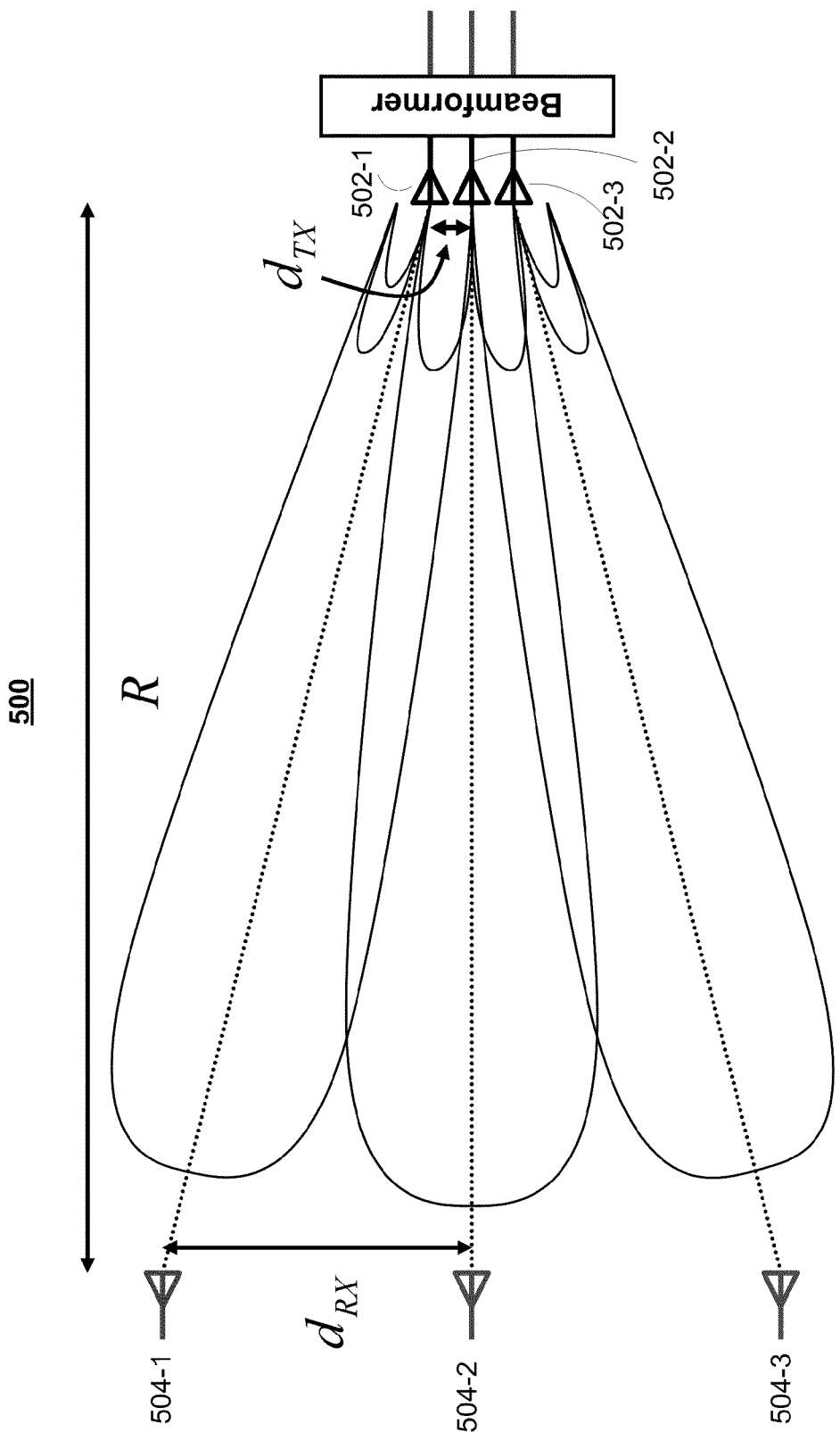
FIG. 5 shows an illustrative diagram of multiple channels of a MIMO-satellite communication system in accordance with an illustrative embodiment of the invention.

FIG. 5 shows an illustrative diagram of multiple channels of a MIMO-satellite communication system in accordance with an illustrative embodiment of the invention. FIG. 5 shows three transmit antennas 502 paired with three receive antennas 504. Each of the transmit antennas 502 transmits a signal to one of the receive antennas 504. In an embodiment, transmit antennas 502 correspond to array of transmit antennas 204 (FIG. 2) and receive antennas 504 correspond to array of ground nodes 214 (FIG. 2). In this example, each of the receive antennas 504 observes a different superposition of the three signals transmitted by transmit antennas 502. Under appropriate conditions, a linear transformation can be applied to the vector of received signals to recover the original transmitted signals. For example, a linear combination of the received channels that recovers only the signal from transmitter 502-1 corresponds to an aggregate array antenna pattern with a mainlobe in the direction of transmitter 502-1 and nulls in the directions of the transmitters 502-2 and 502-3. Such an antenna pattern is physically possible only if the diffraction limit of the receive array is sufficient to resolve the individual transmit antennas. Mathematically, the diffraction limit generally requires that:

$$D_{TX} > \frac{\lambda}{N_{RX} D_{RX}} R \quad (1)$$

where $D_{TX}$ is the spacing between transmit antennas 502, $D_{RX}$ is the spacing between receive antennas 504, $N_{RX}$ is the number of receive antennas 504, $\lambda$ is the wavelength of the transmitted signals, and R is the range between the transmit array 502 and receive array 504. When the diffraction criterion is met, multiple independent scalar communication channels are formed and the data rate will generally grow approximately linearly with the number of such channels. For example, if $N_{RX}$=10, R=36,000 kilometers (assuming that the satellite is launched in a geosynchronous orbit), $\lambda$=1 cm, and $D_{TX}$=100 cm, the spacing between the receive antennas ($D_{RX}$) must be at least 36 kilometers to meet the diffraction limit criteria and create multiple independent channels for MIMO communication.

Spacing transmitter and receiver arrays based on the algebraic expression of Equation (1) allows each transmit element to operate in the same frequency band as other transmit elements with little or no signal interference. While FIG. 5 focuses on an algebraic determination of transmitter and receiver spacing, the spacing of antennas need not conform precisely to the determination of Equation (1) for efficient MIMO communication. For example, antenna spacing determinations that are partially based on Equation (1) can be employed without departing from the scope of the invention. In addition, multiple receivers (or transmitters) can be located relatively close to each other to provide redundancy, provided other receivers (or transmitters) are appropriately spaced.

Figure 6:
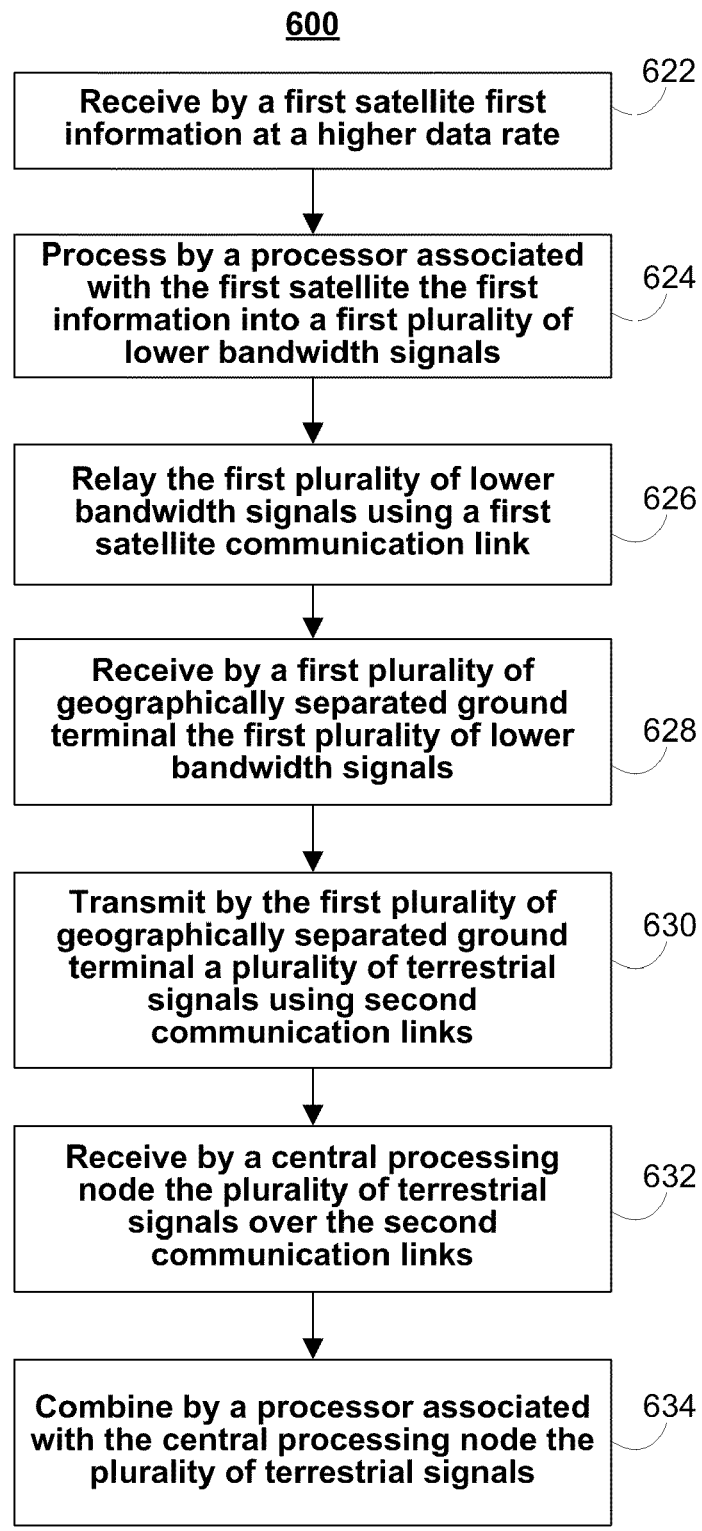
FIG. 6 is an illustrative flowchart of a process 600 for sending data using a satellite MIMO communication network, according to an illustrative embodiment of the invention.

FIG. 6 is an illustrative flowchart of a process 600 for sending data using a satellite MIMO communication network, according to an illustrative embodiment of the invention. In an embodiment, at step 622, the MIMO satellite 202 (FIG. 2) receives first information at a higher data rate. In an embodiment, the information is received from a storage device in communication with the MIMO satellite 202 or from an external source, such as, for example, the sensing satellite 354 (FIG. 3B) or one or more of the arrays of ground nodes 304 and 314 (FIG. 3A). At step 624, a processor 104 (FIG. 1) associated with the satellite 202 processes the higher data rate information into lower bandwidth signals (using e.g., space-time coding) to be transmitted. In an embodiment, the processor 104 utilizes space-time coding to generate from the higher data rate information a separate modulation signal for each transmit antenna in the array of transmit antennas 204 (FIG. 2) associated with the MIMO satellite 202. In an embodiment, the processor 104 includes an encoder that encodes each of the lower bandwidth signals for transmission by the array of transmit antennas 204. At step 626, the MIMO satellite 202 relays the lower bandwidth signals using transmit antennas 204.

Process 600 continues to step 628. At step 628, the array of geographically-separated ground nodes 214 (FIG. 2) receives the lower bandwidth signals using receive antennas 415 (FIG. 4). In an embodiment, each node in the array of ground nodes 214 receives a different linear combination of the transmitted signals. At step 630, the array of ground nodes 214 transmit terrestrial signals to a central processing node 218 using terrestrial communication links 220 (FIG. 2). The terrestrial signals are derived from the received lower bandwidth signals, and can include, without limitation, an analog version of a digital signal, a compressed version of the received lower bandwidth signal, a digitally-sampled version of a received analog signal, an encrypted version of the lower bandwidth signal, or an alternate coding of the lower bandwidth signals. To the extent additional information is needed by the central processing node 218 to process the terrestrial signals, the additional information can be forwarded to the central processing node 218. At step 632, central processing node 218 receives the terrestrial signals.

At step 634, the central processing node 218 combines the received terrestrial signals to obtain or estimate the higher data rate information transmitted by the MIMO satellite 202. The central processing node 218 combines the received signals using known techniques for combining MIMO signals. In an embodiment, the central processing node 218 combines the received signals using an iterative method that iteratively extracts each of the transmitted data 404 from the received terrestrial signals 412 (FIG. 4), and combines the extracted signals based on a channel matrix H. Here, it is assumed, without any loss of generality, that H is a complex matrix that represents the transformative effect of the multiple channels created between the transmitters and receivers. In an embodiment, the central processing node 218 utilizes a space-time decoder matched to the space-time encoding scheme selected. Other embodiments blind channel estimation. Estimates of the MIMO channel matrix H are initially determined using known training data and updated using a combination of previous estimates and training data. A minimum means square error (MMSE) or maximum aposteriori probability (MAP) estimate of each high rate information symbol is constructed from each of the received signals. Other representations of the communication channel can be used without departing from the scope of the invention. Considering the received signals 412 at the input of the central processing node as a vector y of length M, where M is the number of receive antennas, an estimated value or signal for each received signal can be estimated using the MIMO system model:

$$y = Hx + n$$

Here, x is a vector for the original data sent to satellite 202 as the higher data rate information, y is the received vector from the M receive antennas, and n is noise in the channel.

In practice, one or more steps shown in process 600 may be combined with other steps, performed in any suitable order, performed in parallel (e.g., simultaneously or substantially simultaneously) or removed.

The invention may be embodied in other specific forms without departing from the principles or essential characteristics thereof. The foregoing embodiments are therefore to be considered in all respects illustrative, rather than limiting of the invention.

What is claimed is:

1. A satellite communication system comprising:
a first satellite configured to receive first information at a higher data rate, process the first information into a first plurality of lower bandwidth signals, and relay the first plurality of lower bandwidth signals using a first satellite communication link;
a first plurality of geographically-separated ground nodes configured to receive the first plurality of lower bandwidth signals and transmit a plurality of terrestrial signals using second communication links; and
a central processing node configured to receive the plurality of terrestrial signals over the second communication links and combine the plurality of terrestrial signals;
wherein the first satellite utilizes a plurality of transmit antennas to transmit the plurality of lower bandwidth signals, wherein a transmit antenna is separated from other transmit antennas in the plurality of transmit antennas by a separation distance, $D_{TX}$, where $$D_{TX} > \frac{\lambda}{N_{RX} D_{RX}} R,$$

where $D_{RX}$ is a distance between two nodes in the first plurality of ground nodes, $N_{RX}$ is a number of receive antennas in the first plurality of ground nodes, $\lambda$ is a wavelength of a transmitted signal, and R is a range between the plurality of transmit array and the first plurality of ground nodes.

2. The system of claim 1, wherein each ground node in the first plurality ground nodes receives a unique linear combination of the lower bandwidth signals.

3. The system of claim 2, wherein the linear combination received by a ground node includes at most a portion of the first information.

4. The system of claim 1, wherein the first satellite communication link and the second communication links have different data rate capacities.

5. The system of claim 4, wherein the first satellite communication link comprises a radio-frequency link.

6. The system of claim 4, wherein the second communication links are selected from the group consisting of fiber optic links, coaxial cables, microwave links, and other suitable combination thereof.

7. The system of claim 1, wherein the central processing node is configured to combine the plurality of terrestrial signals to obtain the first information using a multi-channel signal processing algorithm.

8. The system of claim 1, comprising a second satellite configured to transmit the first information to the first satellite, wherein the first and the second satellite are in different orbits.

9. The system of claim 1, further comprising a second plurality of geographically-separated ground nodes, wherein the first satellite is configured to receive the first information from the second plurality of geographically-separated ground nodes.

10. The system of claim 1, wherein at least one ground node in the first plurality of ground nodes is separated from other ground nodes of the first plurality of ground nodes by at least 100 meters.

11. The system of claim 1, wherein each communication link in the second communication has a bandwidth between that of the first information and the lower bandwidth signals.

12. The system of claim 1, wherein the first satellite is configured to transmit the first plurality of lower bandwidth signals using a plurality of transmit antennas in a MIMO configuration.

13. The system of claim 12, wherein the first satellite is the sole satellite that is in MIMO communication with the first plurality of ground nodes.

14. The system of claim 1, wherein the first satellite is configured to transmit the first plurality of lower bandwidth signals using at least three transmit antennas in MIMO communication with the first plurality of ground nodes.

15. The system of claim 1, wherein the first satellite is configured to transmit the first plurality of lower bandwidth signals using at least ten transmit antennas in MIMO communication with the first plurality of ground nodes.

16. A method of transmitting first information using a satellite communication network, the method comprising:
receiving by a first satellite the first information at a higher data rate; processing the first information into a first plurality of lower bandwidth signals;
relaying by the first satellite the first plurality of lower bandwidth signals using a first satellite communication link;
receiving by a first plurality of geographically-separated ground nodes the first plurality of lower bandwidth signals; and
transmitting by the first plurality of geographically-separated ground nodes a plurality of terrestrial signals using second communication links for processing by a central processing node;
wherein at least one transmit antenna in the plurality of transmit antennas is separated from other transmit antennas in the plurality of transmit antennas by a separation distance, $D_{TX}$, where $$D_{TX} > \frac{\lambda}{N_{RX} D_{RX}} R,$$

where $D_{RX}$ is a distance between two nodes in the first plurality of ground nodes, $N_{RX}$ is a number of receive antennas in the first plurality of ground nodes, $\lambda$ is a wavelength of a transmitted signal, and R is a range between the plurality of transmit array and the first plurality of ground nodes.

17. The method of claim 16, further comprising:
receiving by the central processing node the plurality of terrestrial signals over the second communication links; and
combining by the central processing node the plurality of terrestrial signals.

18. The method of claim 16, wherein receiving by the first plurality of ground nodes comprises receiving by each node in the first plurality of ground nodes a unique linear combination of the first plurality of lower bandwidth signals.

19. The method of claim 16, wherein the first satellite communication link and the second communication links have different data rate capacities.

20. The method of claim 19, wherein the first satellite communication link comprises a radio-frequency link.

21. The method of claim 19, wherein the second communication links are selected from the group consisting of fiber optic links, coaxial cables, microwave links, and other suitable combination thereof.

22. The method of claim 16, further comprising transmitting by a second satellite the first information to the first satellite, wherein the first satellite and the second satellite are in different orbits.

23. The method of claim 16, further comprising transmitting by a second plurality of geographically-separated ground nodes the first information to the first satellite.

24. The method of claim 16, wherein each link communication link in the second communication links has a data capacity between that of the first information and that of the lower bandwidth signals.

25. The method of claim 16, wherein the relaying by the first satellite comprises relaying the first plurality of lower bandwidth signals using a plurality of transmit antennas in MIMO configuration with the first plurality of ground nodes.

26. The method of claim 25, wherein the first satellite is the sole satellite in MIMO communication with the first plurality of ground nodes.

27. The method of claim 16, wherein the relaying by the first satellite the first plurality of lower bandwidth signals comprises: transmitting by each transmit antenna in a plurality of transmit antennas associated with the first satellite, wherein each transmit antenna uses beamforming.

28. The method of claim 16, wherein the relaying by the first satellite the first plurality of lower bandwidth signals comprises transmitting by the first satellite the first plurality of lower bandwidth signals using at least three transmit antennas in MIMO communication with the first plurality of ground nodes.

29. The method of claim 16, wherein the relaying by the first satellite the first plurality of lower bandwidth signals comprises transmitting by the first satellite the first plurality of lower bandwidth signals using at least ten transmit antennas in MIMO communication with the first plurality of ground nodes.

* * * * *